US007092895B2

(12) United States Patent
Chappel et al.

(10) Patent No.: US 7,092,895 B2
(45) Date of Patent: Aug. 15, 2006

(54) METHOD AND SYSTEM FOR ASSESSING STABILITY OF A PROJECT APPLICATION BY PERFORMING REGRESSION ANALYSIS OF REQUIREMENTS DOCUMENT METRICS

(75) Inventors: Oscar A. Chappel, New Port Richey, FL (US); Chris Creel, Tampa, FL (US)

(73) Assignee: Perot Systems Corporation, Plano, TX (US)

( * ) Notice: Subject to any disclaimer, the term of this patent is extended or adjusted under 35 U.S.C. 154(b) by 804 days.

(21) Appl. No.: 09/760,339

(22) Filed: Jan. 12, 2001

(65) Prior Publication Data

US 2002/0143602 A1  Oct. 3, 2002

(51) Int. Cl.
*G06F 17/30* (2006.01)
(52) U.S. Cl. ....................................... 705/10
(58) Field of Classification Search ............... 705/7, 705/8, 9, 10, 37, 400
See application file for complete search history.

(56) References Cited

U.S. PATENT DOCUMENTS

| 4,912,669 | A | * | 3/1990 | Iwamoto et al. | 715/531 |
| 5,553,282 | A | * | 9/1996 | Parrish et al. | 707/10 |
| 5,903,453 | A | * | 5/1999 | Stoddard, II | 700/79 |
| 5,930,798 | A | * | 7/1999 | Lawler et al. | 707/102 |
| 5,960,196 | A | * | 9/1999 | Carrier et al. | 717/122 |
| 6,073,107 | A | * | 6/2000 | Minkiewicz et al. | 705/7 |
| 6,101,481 | A | * | 8/2000 | Miller | 705/9 |
| 6,272,678 | B1 | * | 8/2001 | Imachi et al. | 717/122 |
| 6,336,217 | B1 | * | 1/2002 | D'Anjou et al. | 717/121 |
| 6,715,130 | B1 | * | 3/2004 | Eiche et al. | 715/514 |

OTHER PUBLICATIONS

Barry Bohem et al., Software Cost Estimation with COCOMO II, Prentice Hall 2000.*
Edward Weller, Using Metrics to Manage Software Projects, IEEE Computer, Sep. 1994.*
William Florac et al., Measure the Software Process: Statistical Process Control for Software Process Improvement, Addison-Wesley, Jul. 1999.*
Michael Daskalantonakis, A Practical View of Software Measurement and Implementation Experiences within Motorola, IEEE Transactions on Software Engineering, vol. 18 No. 11, Nov. 1992.*
Juan Nogueira et al., A Formal Risk Assesment model for Software Evolution, US Army Research Office grant# 38690-MA and 40473-MA.*
Raymon Paul et al., Software Metrics Knowledge and Databases for Project Management, IEEE Transactions on Knowledge and Data Engineering, vol. 11 No. 1, Jan./Feb. 1999.*
Wiegers, Karl E., Automating Requirements Mangement Process Impact, 1999.*
Rational.com—Product Reviews, Rational RequisitePro Product Overview and Highlights web pages Rational.com, 2000, Retrieved from Archive.org Feb. 23, 2005.*

(Continued)

*Primary Examiner*—Tariq R. Hafiz
*Assistant Examiner*—Scott L. Jarrett
(74) *Attorney, Agent, or Firm*—Jenkens & Gilchrist, P.C.

(57) ABSTRACT

A system and method for determining the stability of a project. One embodiment includes computing at least two project progress parameters of a project for numerically describing elements of the project. Regression parameters are computed based upon the project progress parameters and correlation coefficients are computed utilizing the regression parameters. The correlation coefficients describe the strength of the correlation of the project progress parameters for indicating the stability of the project as project develops.

17 Claims, 11 Drawing Sheets

OTHER PUBLICATIONS

Fiebus, Andy, Manage your project's requirements Information Week, Oct. 19, 1998, p. 100.*
Abbot, Bruce, Requirements set the mark InfoWorld, Mar. 5, 2001, vol. 23, No. 10, p. 45.*
Simmons, Dick et al., Software Measurement: A Visualization Toolkit for Project Control and Process Improvement Prentice Hall, Nov. 1997, ISBN: 0-13-840695-2, Table of Contents/Review.*
QSS Delivers Industry's First Enterprise-Wide Requirements Management Suite for E-Business Mar. 22, 2000, Retrieved from Archive.org Oct. 27, 2005.*
TBI.com Web Pages—Caliber—Requirements Management (RM) Mar. 2000, Retrieved from Archive.org Oct. 27, 2005.*
Rational RequisitePro—User's Guide Version 4.5 Rational, 1999.*
Wu, Ching-SEH, Software Project Plan Tracking Intelligent Agent Dissertation, Texas A&M University, Dec. 2000.*
Espinosa, Mario Alberto Garcia, Intelligent Agents Applied to Software Management Dissertation, Texas A&M University, Aug. 1997.*
Shultz, H. P., Software Management Metrics Mitre Corp. Report No. M88-1, May 1988 (Abstract).*
Cordes, D.W. et al., Evaluation Method for User Requirement Documents Information and Software Technology, May 1989, vol. 31, No. 4, Abstract.*
Porter, Adam et al., Empirically Guided Software Development Using Metric-Based Classification Trees IEEE Software, Mar. 1990, pp. 46-54.*
Costello, Rita Jean, Metrics for requirements engineering California State University, Dissertation, 1994, AAT 1360517, Abstract.*
Gyorkos, J., Measurements in software requirements specification process Microprocessing and Microprogramming, Dec. 1994, vol. 40, No. 10, Abstract.*
Robinson, Jeanne Minahan, Risk assessment in software requirements engineering George Mason University, Dissertation, 1995, AAT 9531065, Abstract.*
Jones, Capers, Strategies for managing requirements creep Computer, Jun. 1196, pp. 92-94.*
Pfahl D. et al., Using simulation to analyse the impact of software requirement volatility on project performance Information and Software Technology, Nov. 2000, vol. 42, No. 14, pp. 267-276.*
York, Donald, An early indicator to predict requirements volatility George Mason University, Dissertation, 2001, AAT 3000445, Abstract.*
Simmons, Dick et al., Software Measurement—A visualization toolkit for project control and process improvement Hewlett-Packard Professional Books, ISBN: 01308496952.*

* cited by examiner

160b

| | PROJECT SUMMARY DATA RECORD | | | | | | | |
|---|---|---|---|---|---|---|---|---|
| | object ID | object no. | level in docu | br/lf | date of creation | mod status | mod status | user | age of artifact |
| 205a' | 1 | 246 | 1 | branch | 9-14-00 | 1 | true | <author> | 18 |
| 205b' | 1.1 | 2 | 2 | branch | 9-14-00 | 3 | true | <author> | 18 |
| 205c' | 1.1.1 | 3 | 3 | branch | 9-14-00 | 3 | true | <author> | 18 |
| 210a' | 1.1.1.1 | 4 | 4 | leaf | 9-14-00 | 7 | true | <author> | 18 |
| 210b' | 1.1.1.2 | 245 | 4 | leaf | 9-14-00 | 4 | true | <author> | 18 |
| 210c' | 1.1.1.3 | 15 | 4 | leaf | 9-14-00 | 6 | true | <author> | 18 |
| 205d' | 1.1.1.4 | 17 | 4 | branch | 9-14-00 | 3 | true | <author> | 18 |
| 210d' | 1.1.1.5 | 18 | 5 | leaf | 9-14-00 | 3 | true | <author> | 18 |
| 205e' | 1.1.1.4.0-1 | 19 | 4 | branch | 9-14-00 | 3 | true | <author> | 18 |
| 210e' | 1.1.1.5.1 | 20 | 5 | leaf | 9-14-00 | 3 | true | <author> | 18 |
| 205f' | 1.1.1.5.2 | 22 | 5 | branch | 9-14-00 | 4 | true | <author> | 18 |
| 210f' | 1.1.1.5.2.1 | 27 | 6 | leaf | 9-14-00 | 6 | false | <author> | 18 |

METHOD AND SYSTEM FOR ASSESSING STABILITY OF A PROJECT APPLICATION BY PERFORMING REGRESSION ANALYSIS OF REQUIREMENTS DOCUMENT METRICS

FIELD OF THE INVENTION

The present invention relates generally to development project applications, and, more particularly, but not by way of limitation, to the application of statistical analysis techniques to establish metrics for use in assessing progress of the project applications.

BACKGROUND OF THE INVENTION

In general, metrics have been used to perform such tasks as business process assessment, software design analysis, and software complexity analysis. For example, metrics used for process assessment are typically focused on measuring complexity and tracking process execution times. Because there are limited metrics available that provide reliable tools for assessment of tasks, such as the development of business requirements specifications, the nature of business requirements specifications and other documentary summary data for project applications has made identification of meaningful metrics problematic. Moreover, the challenges of assessing the impacts of project components on the overall progress add to the aforementioned challenges created by documentary summary data. It should be understood, of course, that each project team uses a different developmental approach for defining a requirements specification. For example, some use waterfall, while others use spiral developmental approaches. Regardless of the developmental approach, many project developers use writing methods learned early in their lives. Fundamentally, project developers develop an outline, followed by the content that brings the outline to life. However, at the most fundamental level, the structure of most requirements specifications consists of branches 205a–205f, collectively 205, and leaves 210a–210f, collectively 210, as illustrated in FIG. 2A.

A leaf is, unambiguously, a subsection of a branch. The IEEE 1998-830 standard, a widely used requirements template, provides an example of this structure. For example, section "1.1.1" is a leaf of section "1.1", assuming that there is no section "1.1.1.1". Although not shown in FIG. 2A, each section has a title, e.g., a natural language structure would use a function name, an object oriented structure would use an object name, a requirements specification document would use a section title, and an accounting structure would use an account name. Furthermore, each branch 205 and leaf 210 may also include content, such as text, numbers, images, etc., that define the specification document, accounting ledger, software program, or other document, for example.

Consequently, project managers tasked with managing a requirements specification, as previously stated, may lack reliable methods, beyond raw experience, to successfully monitor the progress of a project. As such, the issue of team synergy (where the individual goal-directed actions are focused on the common end result, with a clear understanding of current reality in relation to the end result) and the impacts of teamwork on project progress, regardless of the project nature, has been unmeasurable, thus far. Hence, the inability to measure progress of the project makes judging success extremely difficult.

SUMMARY OF THE INVENTION

To remedy the deficiencies of determining progress of project applications, the principles of the present invention provide a system and method for employing statistical analysis techniques to quantify the success of project applications by establishing metrics for use in assessing progress of a project application. The statistical analysis techniques use parameter dependencies to provide an operator of a project the ability to assess the progress of the project application. Particularly, regression analysis provides an appropriate computational solution to quantify the success of the project application. Additionally, correlation coefficients derived from the regression analysis provide for determining the strength of the correlation of the parameter dependencies (e.g., age of branch and number of branch modifications). The correlation coefficients provide the operator with confidence that the statistical analysis is reliable.

One embodiment of the present invention provides a system and method for determining the stability of a project. This embodiment includes computing at least two project progress parameters of a project for numerically describing elements of the project. Regression parameters are computed based upon the project progress parameters and correlation coefficients are computed utilizing the regression parameters. The correlation coefficients describe the strength of the correlation of the project progress parameters for indicating the stability of the project as it develops.

The project progress parameters may include, for example, total number of leaves, number of modifications performed on the branches, number of modifications performed on the leaves, average age of leaves in the project, and average age of branches in the project. The project progress parameters are generated from performing statistical analysis on collected project data and used as parameters in mathematical equations to compute the regression parameters. These mathematical equations may include normal equations used in regression analysis, slope equations of a regression model, intercept equations of the regression model, and correlation coefficient equations of the regression model.

BRIEF DESCRIPTION OF THE DRAWINGS

A more complete understanding of the principles of the present invention and the scope thereof is more readily appreciated by reference to the following Detailed Description of the presently-preferred embodiments of the present invention and to the appended claims when taken in conjunction with the accompanying Drawings wherein:

FIG. 2B is an exemplary output from a project summary generation process according to FIG. 4 that describes the block diagram of FIG. 2A;

DETAILED DESCRIPTION

Although the present invention is open to various modifications and alternative constructions, a preferred exemplary embodiment that is shown in the above-referenced drawings is described herein in detail. It is to be understood, however, that there is no intention to limit the invention to the particular forms disclosed. One skilled in the art can recognize that there are numerous modifications, equivalences and alternative constructions that fall within the spirit and scope of the invention as expressed in the claims.

Data collected from a project is used to perform regression analysis to determine information about status of the project (i.e., stability of a project's organization and content). Additionally, regression analysis and hypothesis testing are used to describe actual progress of the project and to evaluate that progress in relation to expected progress. These techniques allow project managers to assess contributions of individual project team members and to forecast possible need for additional or different project team resources.

Figure 1:
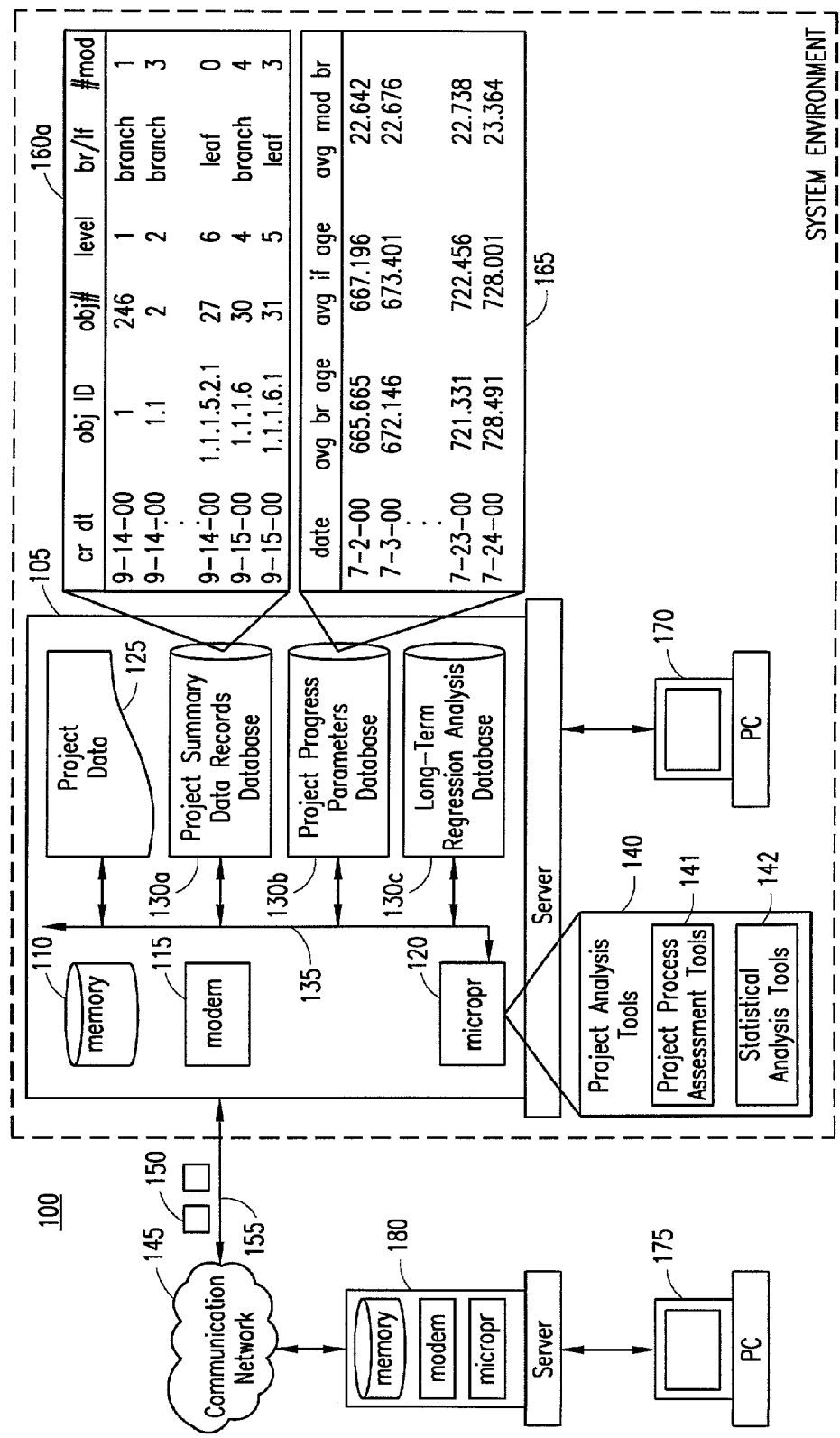
FIG. 1 is an exemplary network based system in which the principles of the present invention operate.

Referring to FIG. 1, there is illustrated an exemplary network based system 100 having a server 105. The server 105 includes a memory 110, a modem 115, and a microprocessor 120. The microprocessor 120 collects project data by reading a data file 125 or a database 130 through a data bus 135. The project data may be a requirements document, specification document, proposal document, request for proposal document, sales performance, manufacturing process, accounting system, distribution system, or software development, for example. The project data is used by the microprocessor 120 during execution of project analysis tools 140, including project process assessment tools 141 and statistical analysis tools 142, to generate statistical data such as project progress parameters, regression parameters, and correlation coefficients. Alternatively, the microprocessor 120 can collect project data from a communication network 145 via data packets 150 transmitted over a wired or wireless interface 155.

It should be understood, of course, that the aforementioned database can be represented as a single database 130 or as separate databases 130a, 130b, and 130c. The databases 130a–130c are created and updated using the project analysis tools 140 and are used for project progress analysis. For example, the project process assessment tools 141 are used to parse the requirements document data. Subsequently, the project process assessment tools 141 causes raw project data to be stored in the project summary data records database 130a, thereby creating or updating a repository of daily project summary data records 160a, shown as a single project summary data record 160b in FIG. 2B. Moreover, the statistical analysis tools 142 are used to perform statistical analysis on the project summary data records 160a contained in database 130a. Accordingly, project progress parameters are generated and the project process assessment tools 141 are used to store the project progress parameters in database 130b. Thus, a repository of daily project progress parameters 165 is created or updated, shown as a single record in Table 1. Furthermore, the statistical analysis tools 142 are used to perform regression analysis on the project progress parameters 165 contained in database 130b. Thus, regression parameters are generated and used to populate regression models. Following, the project process assessment tools 141 are used to store the regression models in database 130c, thereby creating or updating a repository of long-term regression analysis results, shown as a single record in Table 2.

It should be further understood that a user can operate within a system environment using a terminal 170 coupled to the server 105 to implement the principles of the present invention. Alternately, the user can operate outside of the system environment using a remote terminal 175 and server 180 connected to the communication network 145 to implement the principles of the present invention.

Figure 2A:
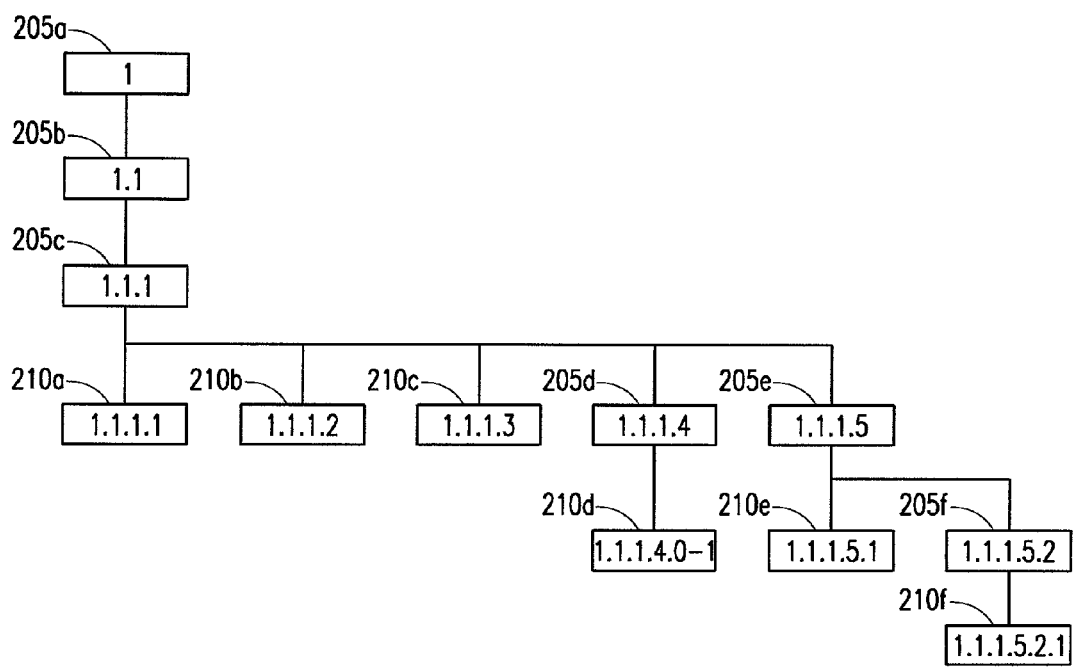
FIG. 2A is an exemplary block diagram of the project data including branches and leaves.

Further referring to FIG. 2A, there is illustrated an exemplary block diagram 200a of the project data organized in a representative tree structure including branches 205 and leaves 210, in which the branches 205 represent structure components of the requirements document and the leaves 210 represent content components of the requirements documents. Additionally, an alternate embodiment of the present invention operates on documents configured in a content markup fashion. Particularly, markup defines a hierarchical structure for text or data. In the case of XML (eXtensible Markup Language), and other markup languages, the markup defines a tree structure. Consequently, markup is concerned with the logical structure and content of the text or data, e.g., to indicate sections, subsections, and headers in a document similar to the branch and leaf structure. For example, an XML document would be formatted in the following manner:

```
<document>
<header#><1.1></header#>
<title><title of paragraph 1.1></title>
<content><Hello World!></content>
</document>.
```

Referring to FIG. 2B, the expressiveness of the branch and leaf structures can be developed using an incremental approach. For example, for every branch 205a'–205f', collectively 205', and leaf 210a'–210f', collectively 210', there is included an object ID 215, object number 220, level in document 225, branch or leaf entry 230, date of creation 235, number of modifications 240, modification status 245, user name 250, and age of artifact 255. Accordingly, leaf and branch metrics (i.e., graphics indicating analysis results generated from using regression statistics computed to assess progress of a project) provided by the principles of the present invention help project managers understand the progress of this development pattern.

Figure 3:
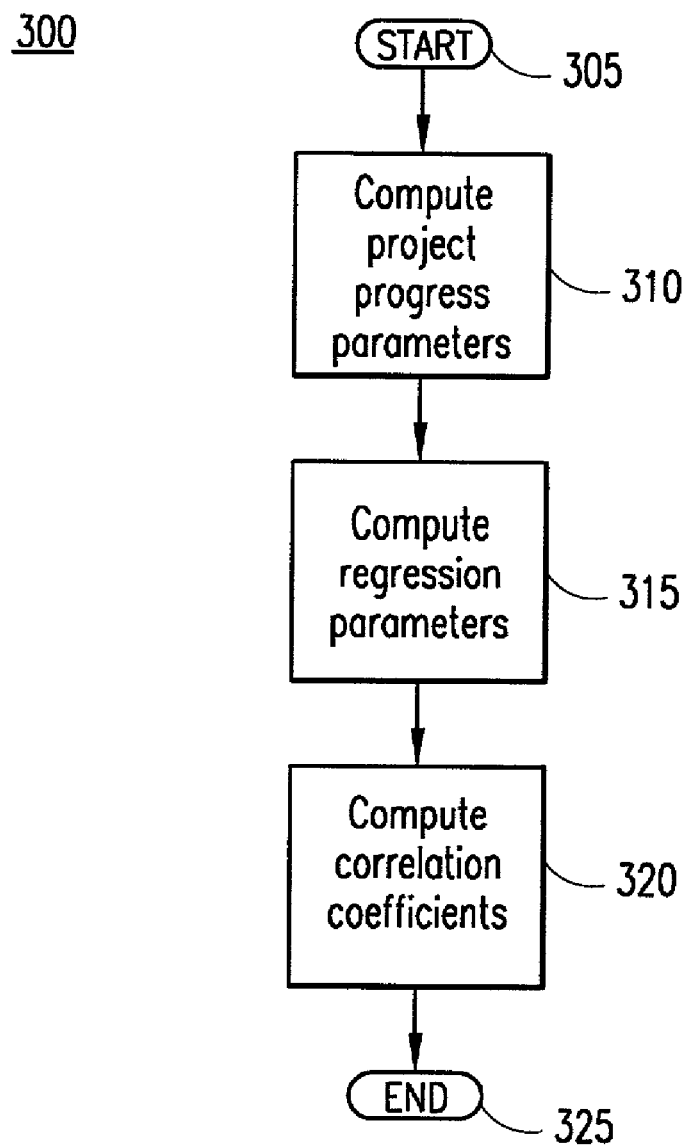
FIG. 3 is an exemplary flow diagram of a process for determining the stability of a project according to the principles of the present invention.

Referring to FIG. 3, there is illustrated an exemplary flow diagram 300 of a process for determining the stability of a project, configured in accordance to the principles of the present invention. The process starts at step 305. At step 310, the project summary data records (e.g., branch and leaf data 205 and 210) are used to perform statistical analysis to compute project progress parameters, which numerically describe elements of the project. Basically, the project elements are branch and leaf objects contained within a "super artifact" as illustrated in FIG. 2B. The project progress parameters represent various project characteristics and may be stored in a database. The project progress parameters may include: total number of branches, total number of leaves, number of modifications performed on the branches, number of modifications performed on the leaves, average age of leaves in the project, and average age of branches in the project, for example.

At step 315, the project progress parameters are used to perform regression analysis to compute regression parameters. This process employs statistical equations used to perform regression analysis, i.e., normal equations (eqns. 1–3) used in regression analysis, including (i) slope (eqn. 4) of the regression model equation, (ii) intercept (eqn. 5) of the regression model equation, (iii) correlation coefficient (eqn. 6) of regression equation, and (iv) alternate equation for the correlation coefficient (eqn. 7) of regression, to compute the regression parameters, develop models of the project development process, and assess the strength of the relationships being analyzed with the metrics that have been established. These equations can be expressed as:

$$S_{XX} = \Sigma_i^2 - (\Sigma X_i)^2/n \quad (1)$$

$$S_{YY} \Sigma Y_i^2 - (\Sigma Y_i)^2/n \quad (2)$$

$$S_{XY} = XY_i - (\Sigma X_i)(\Sigma Y_i)/n \quad (3)$$

$$b_1 = S_{XY}/S_{XX} \quad (4)$$

$$b_0 = \bar{Y} - b_1 \bar{X} \quad (5)$$

$$R^2 = b_1 S_{XY}/S_{YY} \quad (6)$$

$$r = \frac{\sum (X_i - \bar{X})(Y_i - \bar{Y})}{\left(\sqrt{\sum (X_i - \bar{X})^2} \sqrt{\sum (Y_i - \bar{Y})^2}\right)}. \quad (7)$$

The regression parameters (i.e., slope, intercept, correlation coefficient) populate a third data record that includes statistical results indicative of the development of the project. At step 320, the regression parameters are used to compute correlation coefficients. At step 325, the process ends.

The correlation coefficients, when taken together with project summary data records, paint an informative picture about the stability of the project, i.e, the strength of the relationships between independent variables and dependent variables. Additionally, the correlation coefficients are used to populate regression models. Fundamentally, these regression models provide project managers with a means for comparing idealized or estimate curves with actual curves (FIGS. 7–10) in order to adjust their tactical objectives appropriately. Principally, regression analysis is performed to facilitate daily project progress assessments as well as forecast the need for additional resources, whereas, long-term regression analysis is performed in order to accomplish long-term project assessment.

Figure 4:
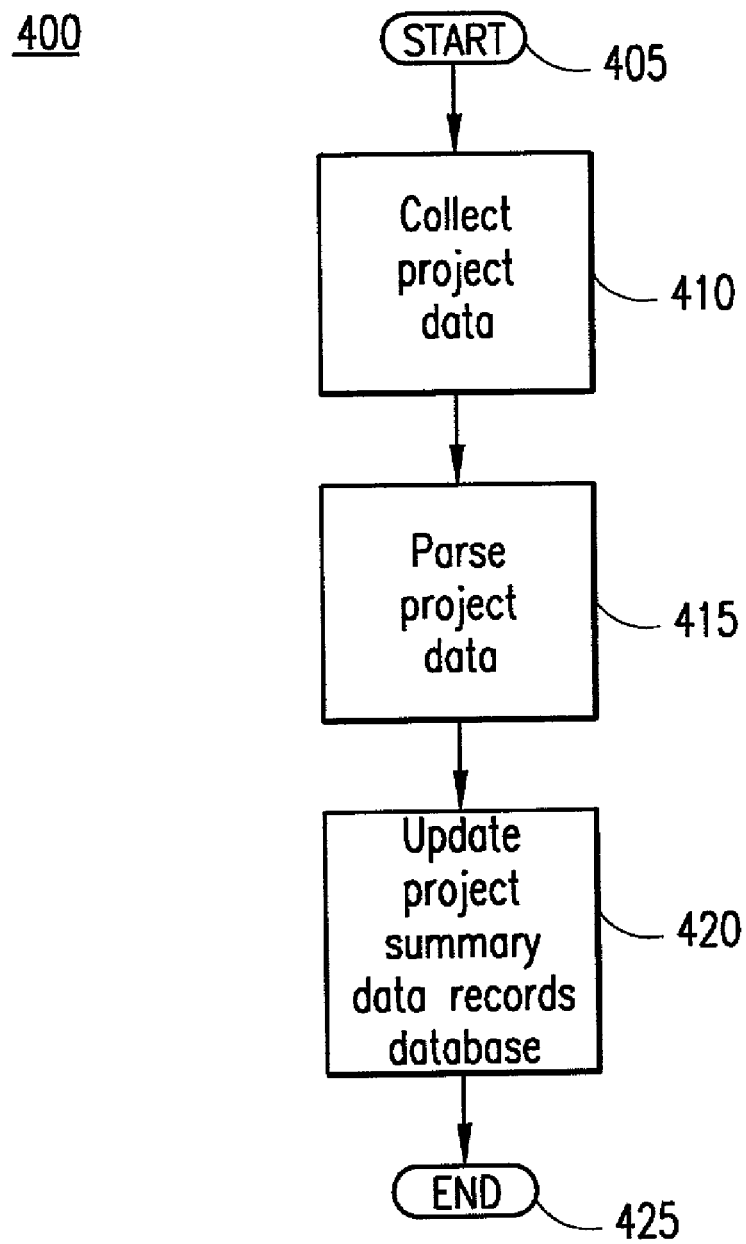
FIG. 4 is an exemplary flow diagram of the project summary data record generation process according to the principles of the present invention.

Referring to FIG. 4, there is illustrated an exemplary flow diagram 400 of the project summary data record or artifact generation process according to the principles of the present invention. The process starts at step 405. At step 410, project data is collected either by reading a project data file 125 or databases 130a–130c, collectively 130, on the server computer 105. Alternately, the project data can be received from a communication network 145 via data packets 150. At step 415, the project data is parsed to extract pertinent data for generating branch and leaf data 205 and 210 (i.e., artifacts) to implement project progress analysis. The project data is summarized 160b as illustrated in FIG. 2B and can be used for the project analysis using regression analysis as described by equations (1–7). Particularly, artifacts can be used for the analysis of the project up to the day the analysis is performed. At step 420, the artifacts are saved to a project summary data records database 130a, which is a repository 160a updated with artifact objects (i.e., project summary data records). At step 425, the process ends.

Figure 5:
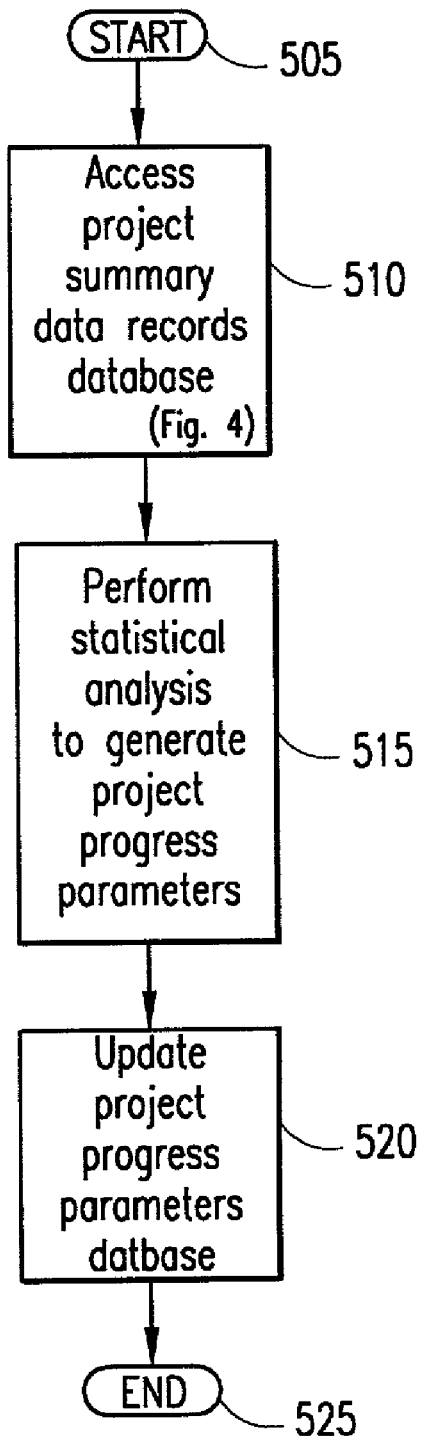
FIG. 5 is an exemplary flow diagram for analyzing summary data records as produced by the flow diagram 400 of FIG. 4.

Referring to FIG. 5, there is illustrated an exemplary flow diagram 500 for analyzing summary data records as produced by the flow diagram 400 of FIG. 4. The process starts at step 505. At step 510 project summary data records 160a are accessed from the project summary data records database 130a. At step 515, the project summary data records are used to perform statistical analysis. At step 520, the project progress parameters are saved to a project progress parameters database 130b, which is a repository 165 updated with project progress parameters. At step 525, the process ends. Accordingly, Table 1 represents exemplary project progress parameters from performing statistical analysis on the project summary records 160a. It should be understood that other desired project progress parameters could be generated.

TABLE 1

| Project Progress Parameters | |
|---|---|
| DATE; | (27 7 2000) |
| AVG-BRANCH-AGE; | 665.665620 |
| SD-BRANCH-AGE; | 29.875499 |
| AVG-LEAF-AGE; | 667.192628 |
| SD-LEAF-AGE; | 0 |
| AVG-MODIFIED-BRANCHES; | 22.642857 |
| SD-MODIFIED-BRANCHES; | 44.936891 |
| AVG-MODIFIED-LEAVES; | 88.785714 |
| SD-MODIFIED-LEAVES; | 180.132079 |
| AVG-BRANCH-MODIFICATIONS; | 3.660910 |
| SD-BRANCH-MODIFICATIONS; | 4.892677 |
| AVG-LEAF-MODIFICATIONS; | 1.827304 |
| SD-LEAF-MODIFICATIONS; | 3.134201 |
| TOTAL-BRANCHES; | 637 |
| TOTAL-LEAVES; | 3179 |
| AVG-BRANCHES; | 45.5 |
| SD-BRANCHES; | 65.055893 |
| AVG-LEAVES; | 227.071428 |
| SD-LEAVES; | 326.246123 |

Figure 6:
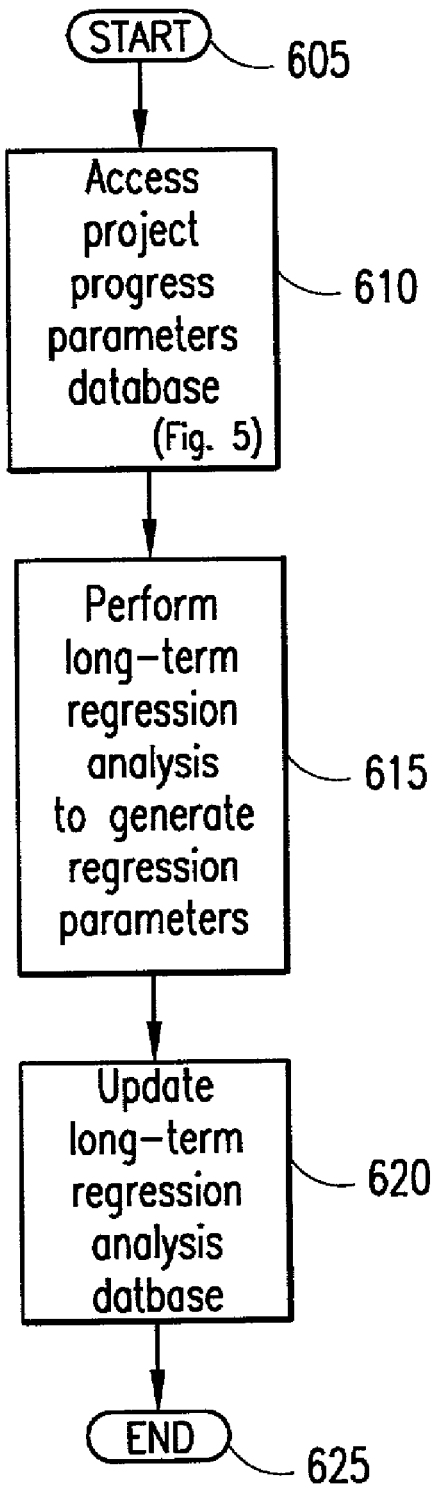
FIG. 6 is an exemplary flow diagram of a long-term regression analysis process as produced by the flow diagram 500 of FIG. 5.

Referring to FIG. 6, there is illustrated an exemplary flow diagram 600 of a long-term regression analysis process as produced by the flow diagram 500 of FIG. 5. The process starts at step 605. At step 610, project progress parameters 165 (e.g., Table 1) are accessed from the project progress parameters database 130b. At step 615, the project progress parameters 165 are used to perform a long-term regression analysis. In particular, this process uses the project progress parameters 165 to compute regression parameters using equations (1–3) as previously described above to generate the long-term regression analysis data. At step 620, the long-term regression analysis data is saved or updated to a long-term regression analysis database 130*c*. The process ends at step 625. Table 2 represents the resulting long-term regression parameters from performing the long-term regression analysis (step 615) on the project progress parameters 165.

TABLE 2

| | Regression Parameters |
|---|---|
| Regression Model: | TOTAL-LEAVES-ON-TOTAL-BRANCHES |
| slope | 22.3333333333333 |
| intercept | −2494.66666666667 |
| correlation coefficient | 1.0 |
| Regression Model: | AVG-LEAF-AGE |
| slope | 2.25261845640354E−14 |
| intercept | 107.480733944954 |
| correlation coefficient | 2.11182980287832E−15 |
| Regression Model: | AVG-BRANCH-AGE |
| slope | 2.25261845640354E−14 |
| intercept | 186.142857142857 |
| correlation coefficient | 2.11182980287832E−15 |
| Regression Model: | TOTAL-LEAVES-ON-TOTAL-BRANCHES |
| slope | 4.19907168643631 |
| intercept | −41.8422726491319 |
| correlation coefficient | 0.641106895479179 |

The metrics described hereinafter allow project managers to monitor the operational progress of a project. Additionally, the 20 principles of the present invention analyze the progress of the project on a tactical and strategic basis. These terms (i.e., operational, tactical, strategic) are based on the systematic approach set forth in the U.S. military publication, entitled "A Tactical Evolution-FM 100-5" and have been modified for business purposes, as discussed in detail below.

In business terms, tactical progress is the management of resources to achieve tactical objectives, which summarily supports operational progress. For example, generally speaking, tactical progress can be defined as the type and amount of work completed each day. Thus, tactical objectives define the type and amount of work team members are expected to complete daily. Specifically, tactical objectives may be set which direct some team members to focus on branch work, and others to focus on leaf work. Based on the type of work, some team members may be directed to work on leaves in parallel, while other team members work serially on branches.

Moreover, in business terms, operational progress is the employment of resources to attain strategic objectives through the design, organization, integration, and execution of tactical measures. For example, generally speaking, operational progress can be defined as the summation of tactical progress on a weekly basis. Thus, operational objectives are based on branch and leaf metrics. Specifically, idealized curves (scaled for a specified schedule) are compared with actual curves and tactical objectives are adjusted appropriately.

Furthermore, in business terms, strategic progress is the art of managing tactical and operational progress to complete an engagement (e.g., a requirements specification) on time, within budget, and within some previously defined parameters. For example, generally speaking, strategic progress can be defined as the summation of operational progress. Thus, strategic objectives relate to cost, effort, and schedules. Specifically, the development of the project is monitored in relation to the strategic objectives, and operational and tactical adjustments are made accordingly.

Figure 7:
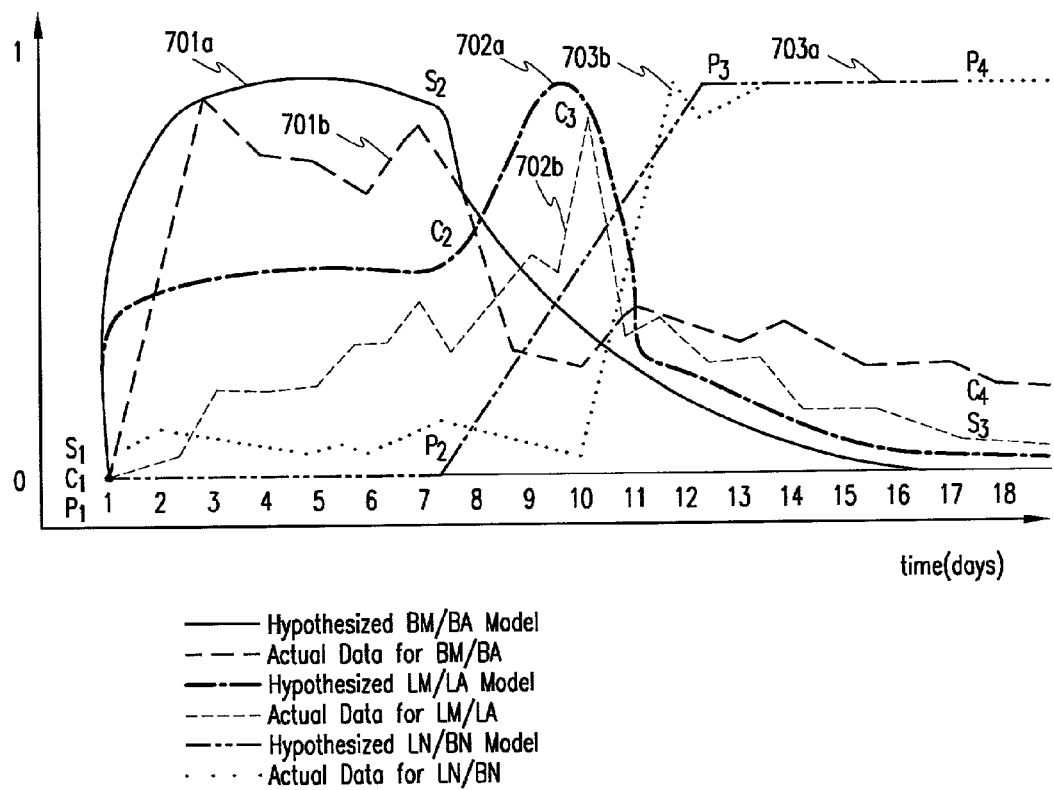
FIG. 7 is a plot comparison of hypothesized models versus actual data collected from an example project resulting from the exemplary flow diagram 500 of FIG. 5.

Referring to FIG. 7, there is illustrated a plot comparison 700 of hypothesized models versus actual data collected from an example project resulting from the exemplary flow diagram 500 of FIG. 5. As discussed above, most project developers first construct a requirements specification outline before proceeding with defining the content of the sections within the outline. This pattern of development explains the popularity of templates (for example, IEEE 1998-830) that predefine the outline. Those skilled in the art recognize that it is very easy to spend too long perfecting an outline, or languish trying to find an outline that works for a given project. By examining the ratio of the number of branch modifications over the life of a project (BM) versus the average branch age in days (BA), project managers can assess the stability of the structure of project application, such as a requirements specification.

Logically, if a project team does not start with a template, a project manager should expect a fast growing population of young branches with a large number of modifications. Thus, the ratio 701 of the BM to BA initially increases as seen by curves 701*a* and 701*b* between days 1–3. However, at some point in time, the increase in BM slows as the project manager finds a structure that works for the problem that the project team specifies. Furthermore, as the project manager's satisfaction with the structure increases, the project team introduces fewer branches, leading to an increasing BA as the branch population ages. Thus, the ratio quickly heads towards zero. Curve 701*a* depicts the logical representation of this assumption or hypothesis.

For example, point $S_1$ represents the start of the project. Logically, point $S_1$ is initially undefined, as all the branches have an initial age of zero. Furthermore, point $S_2$ represents the point at which the project developer determines the specification structure suffices for the problem at hand with modifications. Finally, point $S_3$ represents the end of the project.

Examining the relationships between the points leads to additional comments and determinations a project manager can make about specification structure. Particularly, the area beneath the curve line between points $S_1$ and $S_2$ represents the energy required to build the structure. If the project developer uses a template estimated as appropriate for the problem, then the distance between points $S_1$ and $S_2$ should equal zero, enabling the project developer to simply add content without having to create structure.

As stated above, the area beneath the curve line between points $S_2$ and $S_3$ represents the energy or effort required to adjust the initial structure to match the actual appropriateness of the template to the problem. Accordingly, the smaller the area below the curve 701*a* between $S_2$ and $S_3$, the more appropriate the initially chosen structure illustrates. To further assess the stability of the structure model, curve 701*b*, representing actual data collected from the sample project discussed above, is included in the plot 700. The curve 701*b* reflects the project team's initial estimate that the structure developed by day three was appropriate for the problem the project team faced. For example, each segment of the curve 701*b* with a positive slope represents the project team reassessing the actual appropriateness of the initial structure and adjusting the structure to better fit the problem. Interestingly, the dip between day 10 and day 11 represents an appendix (new structure component) to the project that the project team introduced late in the project.

Once project developers realize a structure that appears to work, they can progress with defining the content that ultimately defines the problem in detail. Unfortunately content definition is another task that often challenges project developers. While project developers often suffer from writer's block, a more common problem is understanding when to stop defining content. It should be understood that content for a requirements specification project is text and/or graphics, while content for a software application project is source code.

Due to the common problem of not understanding when to stop defining content, the energy expended on content definition is the primary contributor to slipping schedules. Therefore, by examining the ratio 702 of the number of leaf modifications over the life of a project (LM) versus the average leaf age in days (LA), project managers can assess content stability for a specification.

Logically, assuming the project team does not start with a template, a project manager expects an increasing population of new, young leaves with few modifications as the project team stabilizes the structure. Leaves may become branches or future branches during project development. Thus, at the beginning of the project, the ratio 702 of LM to LA gradually increases at a slightly faster rate than the ratio 701 of BM to BA because the focus is initially on structure. However, at some point after point $S_2$ described above, the project manager expects the project team to shift its focus from structure definition to content definition. At this point, generally speaking, the project developers introduce multiple leaves per branch. Moreover, at some point, the project team stops producing new content and works with project reviewers to ensure that the existing material is ready for endorsement. Curve 702a depicts the logical representation of this assumption.

For example, point $C_1$ represents the start of the project. Similar to structure stability, point $C_1$ is undefined as the average leaf age is zero. The ratio $C_2/S_2$ represents the point at which the project developer determines that the specification structure suffices for the problem at hand and shifts focus to content. Furthermore, point $C_3$ represents the point at which the project manager and project reviewers agree that the content sufficiently represents the problem, but requires modifications. Finally, point $C_4$ represents the end of the project.

Examining the relationships between the points leads to additional comments and determinations a project manager can make about content. Particularly, the area under the curve between points $C_2$ and $C_3$ represents the energy or effort required to specify the problem detail (i.e., to add content to the structure of the project). It should, of course, be understood to those skilled in the art that, collectively, elicitation methods (e.g., induction), documentation methods, and requirements reuse work to reduce this area.

However, the area beneath the curve line between points $C_3$ and $C_4$ represents the energy or effort required to adjust (i.e., edit) the detail to appropriately define the problem detail. Clearly, employing review methods help to reduce this area. To further assess the stability of the content model, curve 702b, representing actual data collected from the aforesaid sample project, is included in the plot 700. The curve 702b reflects the project team's initial challenge to obtain a structure that enables managing a problem. Consequently, around day 10, the project team realizes a structure and works long hours over the next few days in order to make up for the time lost establishing the structure. In effect, the project team uses the LM to LA ratio 702 to determine the proximity of points $C_2$ and $C_3$, which the project team uses to ensure it realizes the delivery date and to maximize review time.

The description of content stability and structure stability, as discussed above, can be combined by examining the ratio 703 of the number of leaves for a given day (LN) to the number of branches for the same day (BN) in order to study production stability. Logically, a project manager expects an initial increase in the number of branches and future branches (initially appearing as leaves) as the structure becomes increasingly unstable. Thus, the ratio 703 of LN to BN hovers around a constant, approaching one as illustrated by curves 703a and 703b. Once the project team feels the structure is appropriate, the project manager expects the content stability to increase as the project team focuses on creating leaves to capture problem detail. Thus, the ratio 703 of LN to BN sharply increases. After the project team develops the raw material and both the content and structure stability increase, the project manager expects the LN to BN ratio 703 to stabilize and remain constant. Curve 703a depicts the logical representation of these assumptions.

For example, point P1 represents the start of the project. As in the other models, point P1 is technically undefined because the number of branches and number of leaves both equal zero at the start of a project. Furthermore, ratio P2/S2 represents the point at which the content stabilizes and defining the content takes precedence. Moreover, ratio P3/C3 represents the point at which the specification contains enough material to represent the problem in the view of both the project team and the reviewers. Finally, point P4 represents the end of the project.

Examining the relationships between the points leads to additional comments and determinations a project manager can make about production stability. Particularly, the number of days between points P2 and P3 represents the rate at which the project team can identify the problem detail.

As discussed, the distance between points P2 and P3 represents the granularity of the branches. For example, the smaller the distance, the more finely grained the structure (i.e., negligible transition points), potentially decreasing a reviewer's ability to understand a specification. Alternatively, a very large distance represents a structure with coarse granularity (i.e., extensive transition points), also presenting a potential risk of lowering a reviewer's ability to understand a specification. To further assess the stability of the production model, curve 703b, representing actual data collected from the sample project discussed above, is included in the plot 700. The curve 703b reflects the project team's ability to produce the raw material required to specify the problem, however, the stability curves above, indicate that the material produced suffers from prolonged periods of instability. In other words, production was not the problem, but adjusting the material produced to meet the client's needs was a problem. Interestingly, the dip between day 10 and day 11 represents an appendix (new production component) to the project that the project team introduced late in the project, described in the structure stability section above.

It should, of course, be understood to those skilled in the art that the above-mentioned metrics taken alone may not provide individual power greater than the power provided by all of the metrics taken together. However, viewed together in the plot 700, the metrics paint an informative picture about the progress of a project.

Figure 8:
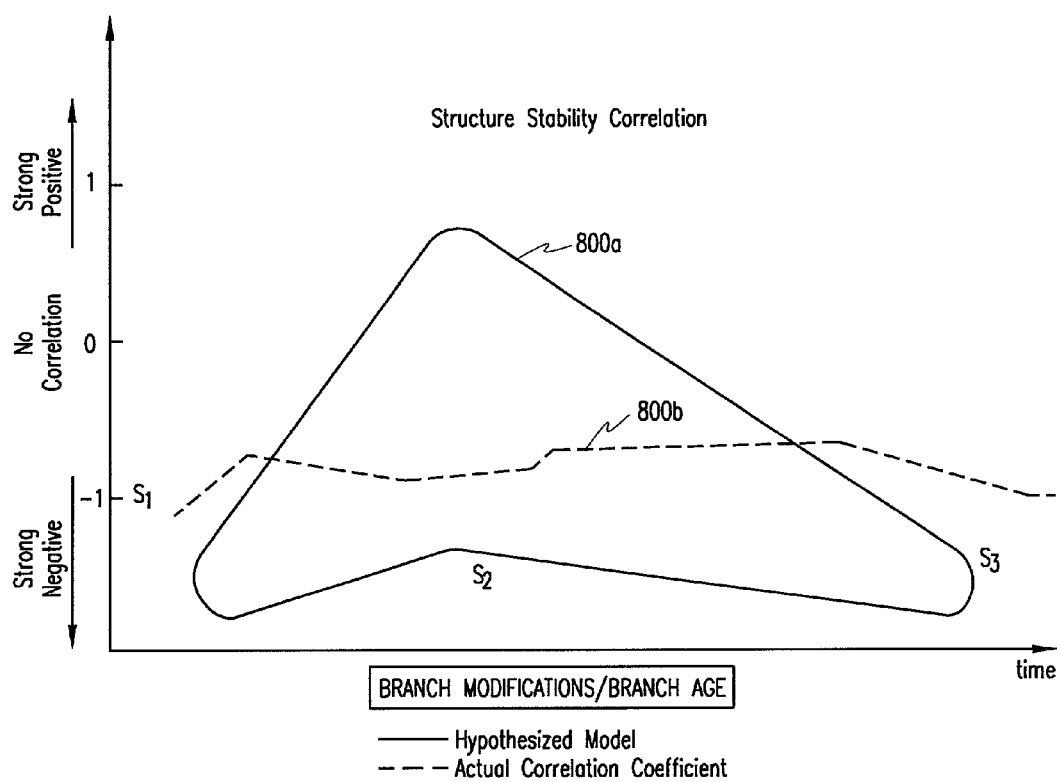
FIG. 8 is a plot comparison of a hypothesized model versus an actual correlation coefficient from regressing the branch modifications (BM) on the age of the branch (BA) of the example project according to FIG. 6.

Referring to FIG. 8, there is illustrated a plot comparison of a hypothesized model versus an actual correlation coefficient from regressing the branch modifications (BM) on the age of the branches (BA) of the example project, according to FIG. 6. Based on the above discussion of the structure stability metric, it is understood that the number of modifications a project developer makes to a branch is dependent on the age of the branch.

Logically, if these dependencies exist, a project manager initially expects to see a strong negative correlation between the number of modifications to a branch and its age because the project developer makes a large number of modifications to a branch on the branch's first day of existence. Next, the project manager expects the correlation to head towards zero on its way to positive as the project developer makes more modifications. Eventually, the correlation heads back towards a strong negative correlation as the project developer stops making modifications to the aging branch. Accordingly, curve 800a depicts an idealized or hypothesized representation of these assumptions. Additionally, curve 800b, representing the actual correlation between the number of branch modifications and the corresponding branch age, is included in plot 800 to further assess the appropriateness of the project team's initially asserted assumptions.

Figure 9:
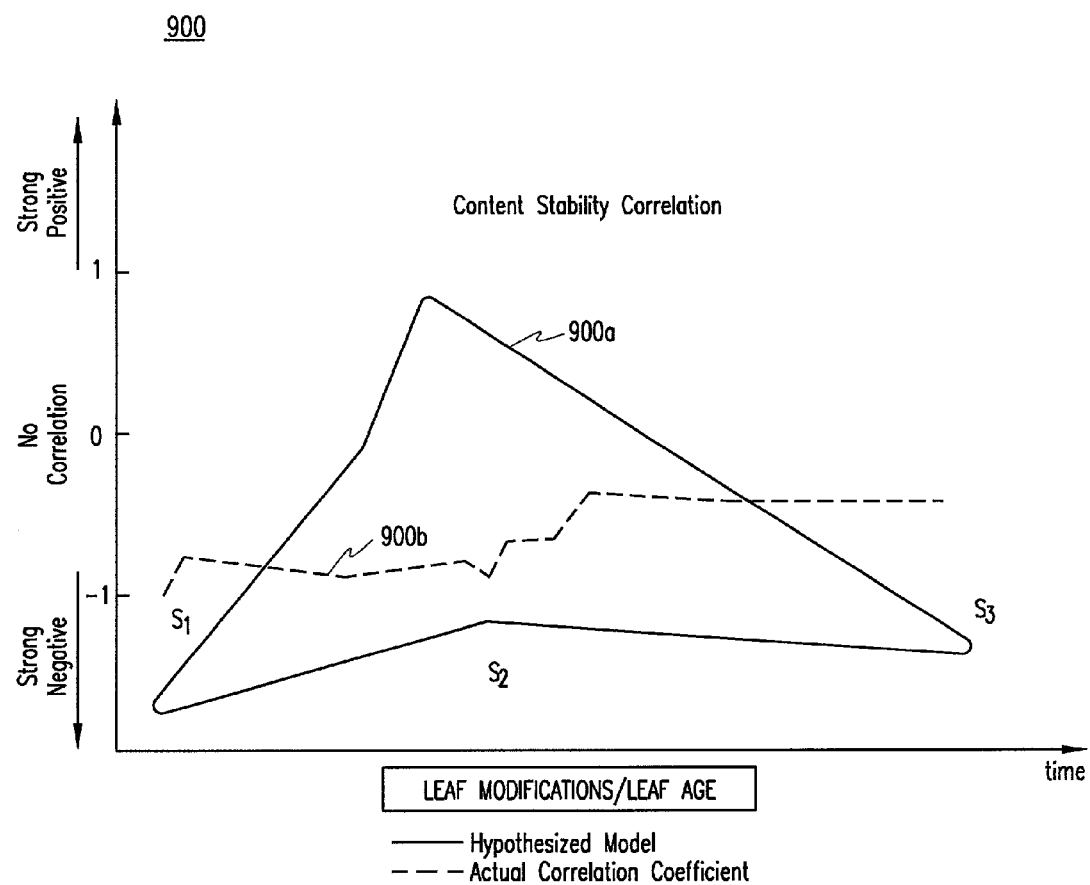
FIG. 9 is a plot comparison of a hypothesized model versus an actual correlation coefficient from regressing the leaf modifications (LM) on the age of the leaf (LA) of the example project according to FIG. 6.

Referring to FIG. 9, there is illustrated a plot comparison of a hypothesized model versus an actual correlation coefficient from regressing the leaf modifications (LM) on the age of the leaf (LA) of the example project, according to FIG. 6. Logically, the correlation coefficient resulting from a regression analysis of the number of leaf modifications on the age of the leaf is similar to the correlation coefficients that accompany the structure stability metric, but is shifted to account for the delayed attention to content. Thus, a project manager expects to initially see a strong negative correlation between the number of modifications to a leaf and its age as the leaves and age grow together. Because the structure is the primary initial focus, project managers should expect an initially weaker correlation coefficient for content than structure. Once the structure stabilizes, the correlation coefficient for content shoots towards zero on its way to positive as the project developer shifts focus to content. Moreover, once the content stabilizes, project managers expect the correlation coefficient to dive negatively as leaves age, but experience fewer modifications. Accordingly, curve 900a depicts an idealized or hypothesized representation of these assumptions. Additionally, curve 900b, representing the actual correlation between the number of leaf modifications and the corresponding leaf age, is included in plot 900 to further assess the appropriateness of the project team's initially asserted assumptions.

Figure 10:
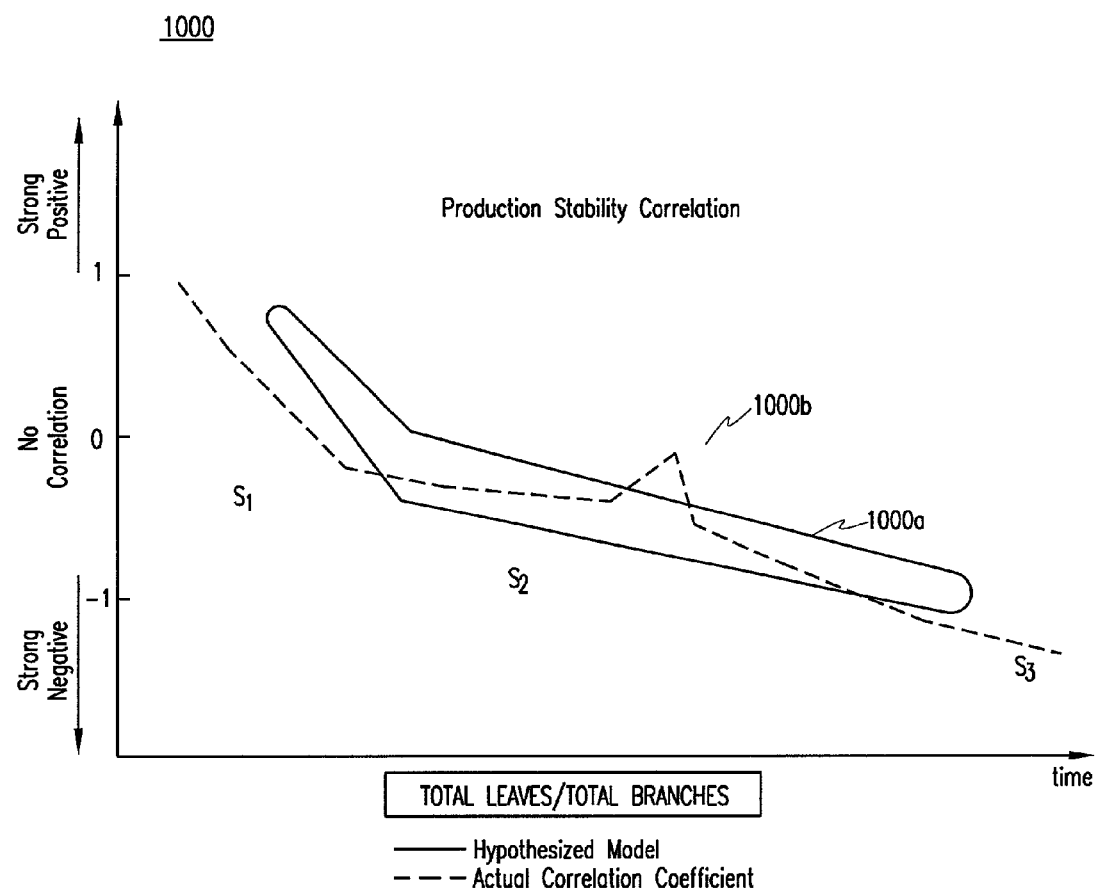
FIG. 10 is a plot comparison of a hypothesized model versus an actual correlation coefficient from regressing the number of leaves (LN) produced per day to number of branches (BN) produced per day of the example project according to FIG. 6.

Referring to FIG. 10, there is illustrated a plot comparison of a hypothesized model versus an actual correlation coefficient from regressing the number of leaves (LN) produced per day to number of branches (BN) produced per day of the example project, according to FIG. 6. Logically, if the production stability assumptions stated above are correct, project managers expect the correlation coefficient of the regression of the number of leaves produced per day on the number of branches produced per day to, initially, be very highly correlated as branches and leaves are produced at a similar rate. Moreover, as the structure stabilizes, project managers expect to see the correlation coefficient head towards negative one (−1) as leaves increase at a much greater rate than branches. Accordingly, curve 1000a depicts an idealized representation of these assumptions. Additionally, curve 1000b, representing the actual correlation between the number of leaves produced per day and the number of branches produced per day, is included in plot 1000 to further assess the appropriateness of the project team's initially asserted assumptions.

Although the presently preferred embodiment is directed toward systems and methods that facilitate project developers in the application of statistical analysis techniques and hypothesis testing to establish metrics for use in assessing project progress, it should be understood that the principles of the present invention may be implemented to perform any analysis process where there is a potential for the value of one variable to be dependent on the value of another and the project regression analysis process is merely a current example.

As will also be recognized by those skilled in the art, the innovative concepts described in the present application can be modified and varied over a wide range of applications. For example, although the embodiments implement project progress analysis, the invention is not limited to such a process and can be practiced in other general business processes, such as Sales Performance Assessment, Manufacturing Process Assessment, and Distribution System Performance Evaluation. Accordingly, the scope of the present invention should not be limited to any of the specific exemplary teachings discussed, but is limited by the following claims.

What is claimed is:

1. A method for assessing stability of a structure of a project application, the method comprising:
   collecting data of the project application, the data being structured as branches and leaves for generating leaf and branch metrics;
   wherein the project application is a requirements document;
   computing from the project application data the leaf and branch metrics;
   computing at least two project application progress parameters based upon the leaf and branch metrics for numerically describing elements of the project application;
   wherein the project application progress parameters include at least one of the following:
   total number of branches;
   total number of leaves;
   number of modifications performed on the branches;
   number of modifications performed on the leaves;
   average age of leaves in the project; and
   average age of branches in the project;
   computing regression parameters based upon the at least two project application progress parameters wherein the two application project progress parameters are based upon the leaf and branch metrics;
   computing correlation coefficients utilizing the regression parameters, the correlation coefficients describing the strength of the correlation of the at least two project application progress parameters with the leaf and branch metrics for indicating the stability of the structure of the project application;
   outputting data records to graphically represent the stability of the structure of the project application;
   wherein the branches are representative of structure components of the requirements document, and the leaves are representative of content components of the requirements document;
   wherein the data of the project application comprises text; and
   wherein the steps of computing the at least two project progress parameters, computing the regression parameters, computing the correlation coefficients, collecting data of the project, and outputting the data records are performed over a computer network.

2. The method of claim 1, wherein the stability of the structure of the project application is determined by utilizing at least one of the following equations:

normal equations used in regression analysis,
slope of the regression model equation,
intercept of the regression model equation, and
correlation coefficient of the regression equation.

3. The method of claim 1, further comprising the step of:
updating at least one database with data records generated from performing statistical analysis on the collected data.

4. The method of claim 3, wherein the collecting of data includes at least one of the following steps:
reading data from a data file or database; or
receiving data across a network.

5. A method for analyzing stability of a structure of a project application, the method comprising:
collecting data of the project application, the data structured as branches and leaves;
wherein the project application is a requirements document;
parsing the data of the project application to produce first data records summarily describing the data of the project application and generating leaf and branch metrics;
computing from the project application data the leaf and branch metrics;
computing second data records based on the first data records, the second data records including statistical data based upon the leaf and branch metrics;
computing third data records, the third data records including statistical results based upon the second data records and being indicative of the stability of the structure of the project application;
outputting at least one of the second and third data records to graphically represent the stability of the structure of the project application;
wherein the third data records are computed using regression analysis, the regression analysis being performed based upon the leaf and branch metrics to facilitate daily project progress assessments and forecast the need for additional resources;
wherein the branches are representative of structure components of the requirements document, and the leaves are representative of content components of the requirements document;
wherein the data of the project application comprises text; and
wherein the steps of collecting the data, parsing the data, computing the second data records, computing the third data records, and outputting are performed over a computer network.

6. The method of claim 5, wherein the collecting of data includes at least one of the following steps:
reading data from a data file or database; or receiving data across a network.

7. The method of claim 5, wherein the second and third data records are stored in a database.

8. The method of claim 5, wherein the statistical results are time dependent.

9. The method of claim 5, wherein the third data records have a dependent relation between the stability of the structure of the project application.

10. The method of claim 5, wherein the first, second, and third data records are structured as objects.

11. The method of claim 5, wherein the project application is formatted according to a content markup language format.

12. The method of claim 5, further comprising computing correlation coefficients based upon the third data records.

13. A system for assessing stability of a structure of a project application, the system comprising:
at least a first processor for executing processes;
at least a first memory device connected to the at least first processor; and
a plurality of processes stored on the at least a first memory device, the plurality of processes configured to cause the at least first processor to:
collect data of the project application, the data being structured as branches and leaves for generating leaf and branch metrics;
wherein the project application is a requirements document;
compute the leaf and branch metrics from the project application data;
compute at least two project application progress parameters based upon the leaf and branch metrics for numerically describing elements of the project application;
wherein the project application progress parameters include at least one of the following:
total number of branches;
total number of leaves;
number of modifications performed on the branches;
number of modifications performed on the leaves;
average age of leaves in the project; and
average age of branches in the project;
compute regression parameters based upon the at least two project application progress parameters wherein the at least two project application progress parameters are based upon the leaf and branch metrics;
compute correlation coefficients utilizing the regression parameters, the correlation coefficients describing the strength of the correlation of the at least two project application progress parameters with the leaf and branch metrics for indicating the stability of the structure of the project application;
output the data records to graphically represent the stability of the structure of the project application;
wherein the data of the project application comprises text; and
wherein the branches are representative of structure components of the requirements document, and the leaves are representative of content components of the requirements document.

14. The system of claim 13, wherein the stability of the structure of the project application is determined by utilizing at least one of the following equations:
normal equations used in regression analysis,
slope of the regression model equation,
intercept of the regression model equation, and
correlation coefficient of the regression equation.

15. The system of claim 13, wherein the plurality of processes are further configured to cause the at least a first processor to:
update at least one database with data records generated from performing statistical analysis on the collected data.

16. The system of claim 15, wherein the at least first processor further collects data by performing at least one of the following:
reading data from a data file or database; or
receiving data across a network.

17. A system for assessing stability of a structure of a project application, the system comprising:
- means for collecting data of the project application, the data being structured as branches and leaves for generating leaf and branch metrics;
- wherein the project application being a requirements document;
- means for computing the leaf and branch metrics from the project application data;
- means for computing at least two project application progress parameters based upon the leaf and branch metrics for numerically describing elements of the project application;
- wherein the project application progress parameters include at least one of the following:
  - total number of branches;
  - total number of leaves;
  - number of modifications performed on the branches;
  - number of modifications performed on the leaves;
  - average age of leaves in the project; and
  - average age of branches in the project;
- means for computing regression parameters based upon the at least two project application progress parameters wherein the two project application progress parameters are based upon the leaf and branch metrics;
- means for computing correlation coefficients utilizing the regression parameters, the correlation coefficients describing the strength of the correlation of the at least two project application progress parameters with the leaf and branch metrics for indicating the stability of the structure of the project application;
- means for outputting data records to graphically represent the stability of the structure of the project application;
- wherein the data of the project application comprises text; and
- wherein the branches are representative of structure components of the requirements document, and the leaves are representative of content components of the requirements document.

* * * * *

UNITED STATES PATENT AND TRADEMARK OFFICE
CERTIFICATE OF CORRECTION

PATENT NO. : 7,092,895 B2
APPLICATION NO. : 09/760339
DATED : August 15, 2006
INVENTOR(S) : Christopher Creel It is certified that error appears in the above-identified patent and that said Letters Patent is hereby corrected as shown below:

Column 7, lines 27-28   Replace "Additionally, the 20 principles"
                        With --Additionally, the principles--

Signed and Sealed this

Fifth Day of December, 2006

JON W. DUDAS
*Director of the United States Patent and Trademark Office*